United States Patent
Bilal et al.

(10) Patent No.: US 11,630,660 B2
(45) Date of Patent: Apr. 18, 2023

(54) FIRMWARE MANAGEMENT

(71) Applicant: VMware, Inc., Palo Alto, CA (US)

(72) Inventors: Ahmad Bilal, Bellevue, WA (US);
Thanhy Mather, Bellevue, WA (US);
Tomas Vetrovsky, Bellevue, WA (US);
Pavel Zeman, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 17 days.

(21) Appl. No.: 17/068,746

(22) Filed: Oct. 12, 2020

(65) Prior Publication Data

US 2021/0042109 A1 Feb. 11, 2021

Related U.S. Application Data

(63) Continuation of application No. 16/043,366, filed on Jul. 24, 2018, now Pat. No. 10,802,821.

(51) Int. Cl.
*G06F 8/71* (2018.01)
*G06F 1/3206* (2019.01)
*G06F 9/445* (2018.01)

(52) U.S. Cl.
CPC ............ *G06F 8/71* (2013.01); *G06F 1/3206* (2013.01); *G06F 9/44505* (2013.01)

(58) Field of Classification Search
None
See application file for complete search history.

(56) References Cited

U.S. PATENT DOCUMENTS

| | | | | |
|---|---|---|---|---|
| 6,108,712 A * | 8/2000 | Hayes, Jr. | ............ | G06F 9/44505 709/246 |
| 7,590,835 B1 * | 9/2009 | Nallagatla | ............ | G06F 9/44505 710/8 |
| 7,904,899 B2 | 3/2011 | Robalewski et al. | | |
| 2003/0217358 A1 * | 11/2003 | Thurston | ............ | G06F 8/60 717/174 |
| 2006/0156140 A1 * | 7/2006 | Van Haegendoren | | G06F 11/1417 714/741 |
| 2007/0169092 A1 * | 7/2007 | Lee | ............ | G06F 8/65 717/168 |
| 2007/0245162 A1 * | 10/2007 | Loffink | ............ | G06F 1/32 713/300 |
| 2010/0262816 A1 * | 10/2010 | Klings | ............ | G06F 9/44536 713/1 |
| 2013/0295902 A1 * | 11/2013 | Justen | ............ | H04W 4/50 455/418 |
| 2015/0019692 A1 * | 1/2015 | Chandaria | ............ | G06F 9/455 709/219 |
| 2015/0020060 A1 | 1/2015 | Bandakka et al. | | |
| 2018/0359144 A1 * | 12/2018 | Malaspina | ............ | H04L 67/34 |
| 2019/0272155 A1 * | 9/2019 | Chowdhary | ............ | G06F 8/36 |
| 2020/0026505 A1 * | 1/2020 | Olderdissen | ............ | G06F 9/44526 |

* cited by examiner

*Primary Examiner* — Ryan D. Coyer
(74) *Attorney, Agent, or Firm* — Thomas | Horstemeyer, LLP

(57) ABSTRACT

Disclosed are various examples for enforcing firmware profiles. First, it is determined that a device record associated with a client device fails to specify a firmware profile. A firmware profile is then generated for the client device. Subsequently, a command is generated that causes a firmware of the client device to be configured based at least in part on the firmware profile. The firmware profile is then stored in the device record.

20 Claims, 9 Drawing Sheets

FIRMWARE MANAGEMENT

CROSS-REFERENCE TO RELATED APPLICATIONS

This application is a continuation of and claims the benefit of U.S. patent application Ser. No. 16/043,366, entitled "FIRMWARE MANAGEMENT," and filed Jul. 24, 2018, the disclosure of which is expressly incorporated by reference herein in its entirety.

BACKGROUND

Administrators of corporate networks and other enterprise infrastructure are expected to enforce policy compliance for any device that an employee can use for work. Administrators at some enterprises require an employee to enroll with a management service capable of protecting enterprise data. The management service can deploy programmatic agents that can configure device settings at an application, operating system, or a networking level. However, these programmatic agents may be restricted from configuring settings for the firmware of the managed devices.

System Integrators and Original Equipment Manufacturers (OEMs) offer tools that allow administrators to access firmware settings of a device. For example, depending on the firmware, administrators can create scripts that use the tools to access firmware settings of individual devices and read or specify values for individual firmware settings. Unfortunately, remotely configuring a device, or a multitude of devices with varying firmwares, can be problematic even when using these tools.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to managing firmware for client devices enrolled with an enterprise mobility management (EMM) system. The EMM system can maintain a record for each client device managed by the EMM, which includes a profile for that specifies preferred or mandatory values for various firmware settings. The EMM system can enforce various policies for the firmware of an enrolled client device, such as requiring a minimum firmware version to be installed or requiring various settings of the firmware to be configured in a particular manner.

By using an EMM system to enforce policies for an enrolled device's firmware, the security of client devices under the control of the EMM system can be increased. For example, most individual users rarely, if ever, manually upgrade their firmware for their devices, even though security vulnerabilities within firmware can allow for unauthorized, remote access and control of a device. Likewise, most update mechanisms for operating systems do not provide an ability to update the firmware of a device, because the firmware for each device is often specific to the manufacturer, model, and hardware revision of the device. The uniqueness of firmware to individual devices also makes it hard to specify enterprise wide policies because there is no guaranteed that two different versions of the same firmware, much less two different firmwares from two different manufacturers, will offer the same capabilities.

Figure 1:
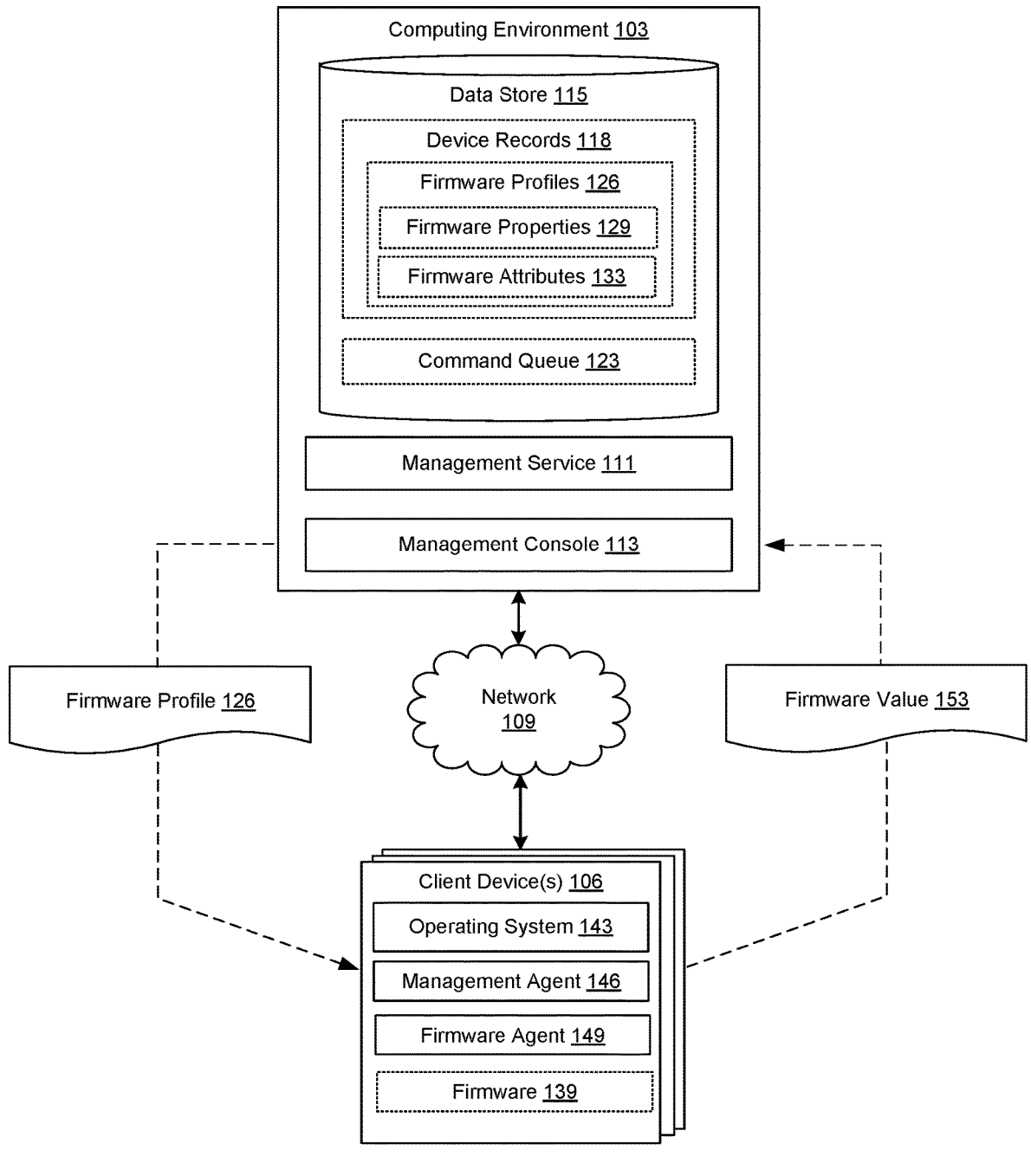
FIG. 1 is a drawing of a networked environment including a management service that communicates firmware profiles to managed devices.

With reference to FIG. 1, shown is an example of a networked environment 100. The networked environment 100 can include a computing environment 103 and one or more client devices 106 (also called client device 106) in communication with one other over a network 109. The network 109 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FIP), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations.

The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 109, the computing environment 103 can be described as a remote computing environment 103.

Various applications can be executed in the computing environment 103. For example, a management service 111 and a management console 113, as well as other applications, may be executed in the computing environment. Also, various data is stored in a data store 115 that is accessible to the computing environment 203. The data store 115 may be representative of a plurality of data stores 115, which can include relational databases, object-oriented databases, hierarchical databases, hash tables or similar key-value data stores, as well as other data storage applications or data structures. The data stored in the data store 115 is associated with the operation of the various applications or functional entities described below. This data can include one or more device records 118, a command queue 123, as well as potentially other data.

The management service 111 can be executed to oversee the operation of client devices 106 enrolled with the management service 111. In some examples, an enterprise, such as a company, organization, or other entity, can operate the management service 111 to oversee or manage the operation of the client devices 106 of its employees, contractors, customers, or other users having accounts with the enterprise. The management service 111 can further cause device records 118 to be created, modified, or removed from the data store 115. This can include adding a firmware profile 126 to a device record 118, removing a firmware profile 126 from a device record 118, or editing a firmware profile 126 previously applied to a device record 118. Commands issued by the management service 111 for client devices 106, such as to apply settings specified in a firmware profile 118, may be stored in the command queue 123 by the management service 111. As discussed later, the client device 106 may access the command queue 123 and retrieve and execute any commands stored in the command queue 123 for the client device 106.

The management console 113 provides an interface for client devices 106 to interact with and control the operation of the management service 111. For example, the management console 113 can include a web server that generates one or more web pages that can be displayed on the client device 106. An administrative user can interact with the web pages served by the management console 113 to add, remove, or modify device records 118. For instance, the administrative user could use the management console 113 to apply a firmware profile 126 to a device record 118 or modify or remove a firmware profile 126 applied to a device record 118. In addition, the management console 116 can also provide a public application programming interface (API) that is accessible across the network 106. Standalone applications installed on a client device 106 can call or otherwise invoke one or more functions provided by the API to programmatically control the operation of the management service 113, including adding, removing, or modifying device records 118.

A device record 118 can represent data related to a client device 106 enrolled with or otherwise managed by the management service 111. Various types of information or data can be stored in a device record 118, such as the owner or user of a client device 106, policies applicable to a client device 106, configuration settings for the client device 106, the type of client device 106 (e.g., laptop, desktop, smartphone, or tablet), the manufacturer of the client device 106, the model of the client device 106, a list of applications installed on the client device 106 and the respective version, as well as other data. For example, the device record 118 could include a firmware profile 126 for the firmware installed on the client device 106.

A firmware profile 126 represents a configuration profile for the firmware 139 installed on a client device 106. For example, the firmware profile 126 can store values for various firmware properties 129, such as the current version of the firmware 139 installed or the version of the firmware 139 that is to be installed. Likewise, the firmware profile 126 could specify values that are to be set for firmware attributes 133 or values that are currently set for firmware attributes 133. As discussed later, changes to the firmware profile 126 can be sent to the client device 106 to cause the client device 106 to change the state of the firmware 139 installed on the client device 106.

A firmware property 129 represents data regarding the firmware 139 installed on a client device 106. One example of a firmware property 129 is the current version of the firmware 139 installed on the client device 106 or the version of the firmware 139 to be installed on the client device 106. Another example of a firmware property 129 would be a cryptographic hash of the installation file for the firmware 139.

A firmware attribute 133 represents a modifiable configuration setting of the firmware 139. For example, a firmware 139 may provide settings that allow a user to enable or disable hardware features provided by the client device 106 (e.g., symmetric multithreading (SMT), a trusted platform module (TPM) installed on the client device 106, processor instruction sets (e.g., virtualization instructions), wake-on-lan (WOL) functionality, power consumption features, or similar hardware features), otherwise configure the operation of the client device 106 (e.g., specifying a boot device order, configuring a clock speed of the processor or memory of the client device, configuring memory timings for the client device 106, or similar settings). Each setting may be represented in the firmware profile 126 as a firmware attribute 133 with a corresponding value that specifies whether the feature is enabled, disabled, or specifies an operational parameter for the feature.

A command queue 123 can represent a set of pending commands or instructions issued by the management service 111 to one or more client devices 106. In some implementations, a command queue 123 may be created for each client device 106 enrolled or registered with the management service 111. Firmware profiles 126 or other commands or instructions for a client device may be stored in the command queue 123. At periodic intervals, the client device 106 may retrieve the firmware profiles 126, commands, or instructions from the respective command queue 123 for the client device 106. In other implementations, a single command queue 123 may be used for all client devices 106. In these implementations, each firmware profile 126, command, or instruction stored in the command queue 123 may be tagged with a unique identifier for a client device 106. The client device 106 may, at periodic intervals, retrieve any firmware profiles 126, commands, or instructions from the command queue tagged with the respective unique identifier for the client device 106.

The client device 106 is representative of one or more client devices that may be connected to the network 109. Examples of client devices 106 include processor-based systems, such as desktop computers, a laptop computers, a personal digital assistant, a cellular telephone, a smartphone, a tablet computer system, smart speakers or similar headless devices, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include firmware 139 that can provide low-level control of the operation of the hardware of the client device 106. In some instances, firmware 139 can provide a standardized operating environment for more complex software executing on the client device 106. For example, the PC-compatible Basic Input/Output System (PC-BIOS) used by many desktops, laptops, and servers initializes and test system hardware components, enables or disables hardware functions as specified in the PC-BIOS configuration, and the loads a boot-loader from memory to initialize an operating system 143 of the client device 106. The PC-BIOS also provides a hardware abstraction layer (HAL) for keyboard, display, and other input/output devices which may be used by the operation system 143 of the client device 106. The Unified Extensible Firmware Interface (UEFI) provides similar functions as the BIOS, as well as various additional functions such as Secure Boot, a shell environment for interacting with the client device 106, network 109 connectivity for the client device 106, and various other functions. Other client devices 106 may use other implementations of firmware 139 (e.g., OpenFirmware/OpenBoot, Coreboot, Libreboot, and similar implementations)

A client device 106 can include an operating system 143 configured to execute various client applications. Examples of operating systems 143 include MICROSOFT WINDOWS®, APPLE macOS®, APPLE iOS®, GOOGLE ANDROID®, and various distributions of Linux. The client applications can include web browsers, enterprise applications, social networking applications, word processors, spreadsheet applications, and media viewing applications. The client device 106 can also execute the management agent 146 and the firmware agent 149.

The management agent 146 can be executed by the client device 106 to maintain data communication with the management service 111 in order to perform various actions on the client device 106 in response to instructions received from the management service 119. In some instances, the management agent 146 includes a separate application executing on the client device 106. In other instances, the management agent 146 includes a mobile device management (MDM) framework provided by or included in the operating system 143 installed on the client device 106. The management agent 146 can be configured to contact the management service 111 at periodic intervals and request that the management service 111 send any firmware profiles 126, commands, or instructions stored in the command queue 123 to the management agent 146. The management agent 146 can then cause the client device 106 to perform the commands provided by the management service 111 or cause the client device 106 to modify the firmware 139 installed on the client device 106 to match the values of one or more firmware attributes 133 specified by the firmware profile 126 received from the management service 111.

The firmware agent 149 can be executed by the client device 106 to expose configuration settings and values of the firmware 139 to a user or other applications. In some embodiments, the firmware agent 149 may expose an application programing interface (API) that can be used by other applications, such as the management agent 146, to interact with the firmware 139. For example, the API exposed by the firmware agent 149 may allow the management agent 146 to update the installed version of the firmware 139, modify a configuration setting for the firmware 139 to match a value specified by a firmware attribute 133 of a firmware profile 126, or check a value for a particular firmware property 129 of the installed firmware 139 or configuration setting of the installed firmware 139. Because firmware 139 is often customized for each make and model of a client device 106 due to various hardware differences between vendors or models, the firmware agent 149 is often provided by the manufacturer of the client device 106. For example, DELL, HP, LENOVO, and other manufacturers may provide their own firmware agent 149 for client devices 106 that they manufacture.

Next, a general description of the operation of the various components of the networked environment 100 is provided. A more detailed description of the operation of some of the components is provided later in the discussions of FIGS. 2-9.

To begin, a user configures a firmware profile 126 for one or more client devices 106 through a user interface provided by the management console 113. For example, the user could specify values for individual firmware attributes 133. For instance, the user could specify that specific hardware features be enabled, such as symmetric multithreading, virtualization instructions, or other features. As another example, the user could specify conditions for individual firmware properties 129. For instance, the user could specify a minimum version of the firmware 139 installed on the client device 106 or a specific version of the firmware 139 to be installed on the client device 106.

Once the firmware profile has been created, the user can then specify one or more client devices 106 or groups of client devices 106 to which the new firmware profile 126 is to be applied. For example, the user could select individual client devices 106, all client devices 106 from a particular manufacturer, all client devices 106 of a particular model, all client devices 106 within a particular organization or department, or other groups of client devices 106. The management service 111 then saves the firmware profile 126 to the device record 118 for each client device 106 to which the firmware profile 126 is to be applied, or the management service 111 links the firmware profile 126 with each device record 118 for each client device 106 to which the firmware profile is to be applied, depending on the implementation.

After the firmware profile 126 has been saved to a device record 118 for a client device 106, the management service 111 stores a command in or otherwise adds a command to the command queue 123. In some implementations, the command may include a client identifier for the client device 106 and a copy of the new firmware profile 126. In other implementations, the command may be stored in or saved to a command queue 123 specific to the client device 106. In these implementations, the command may include the firmware profile 126 without a client identifier.

The management agent 146 subsequently retrieves the command from the command queue 123, thereby receiving the firmware profile 126 from the management service 111. The management agent 146 can then analyze the firmware profile 126 and parse it for values for firmware properties 129, values for firmware attributes 133, and other data. The management agent 146 can then pass the identified firmware properties 129 and firmware attributes 133, as well as the specified values, to the firmware agent 149.

The firmware agent 149 can then modify the firmware 139 so that the values for the firmware properties 129 and firmware attributes 133 of the firmware 139 match the values of the firmware properties 129 and firmware attributes 133 specified in the firmware profile 126. For example, the value of the firmware property 129 could specify the current version of the firmware 139 installed on the client device 106 is older than the value of the firmware property 129 in the firmware profile 126 specifying the version of the firmware 139 to be installed on the client device 106. In response, the firmware agent 149 may download and install a new version of the firmware 139 on the client device 106 that is at least as current as the version specified by the firmware property 129 in the firmware profile 126. As another example, if a value for a firmware attribute 133 in the firmware profile 126 specifies that Secure Boot are to be enabled, the firmware agent 149 may set the Secure Boot parameter to "enabled." Similarly, if a value for a firmware attribute 133 in the firmware profile 126 specifies that virtualization instructions are to be enabled, the firmware agent 149 may enable virtualization instructions in the firmware 139. Likewise, a value for a firmware attribute 133 in the firmware profile 126 could specify a maximum clock frequency or voltage for the central processing unit (CPU) of the client device. In this instance, the firmware agent 149 may configure the firmware 139 to enforce the maximum clock frequency or voltage for the CPU accordingly. In another example, a value for a firmware attribute 133 in the firmware profile 126 could specify that the use of a trusted platform module (TPM) should be enabled. Therefore, the firmware agent 149 could configure the firmware 139 to enable the use of a TPM chip included on the motherboard of the client device 106. Various other modifications to the firmware 139 may be implemented by the firmware agent 149 as defined by the firmware profile 126.

In some implementations, the firmware agent 149 can also be configured to report back at periodic intervals firmware values 153. These firmware values 153 may be the current value for various firmware properties 129 or firmware attributes 133 of the firmware 139 installed on the client device 106. For example, the firmware 139 may be able to track the charge storage capacity of a battery that powers the client device 106 over time (e.g., the battery for a laptop or mobile phone). As the battery goes through repeated charge and discharge cycles, its maximum charge storage capacity gradually decreases over time. This charge storage capacity could be tracked by the firmware 139, read by the firmware agent 149 at periodic intervals, and reported to the management service 111 at periodic intervals. When the maximum charge capacity for the battery dips below a threshold value, the management service 111 could notify and administrator or automatically place an order for a new batter with an electronic commerce system.

Figure 2:
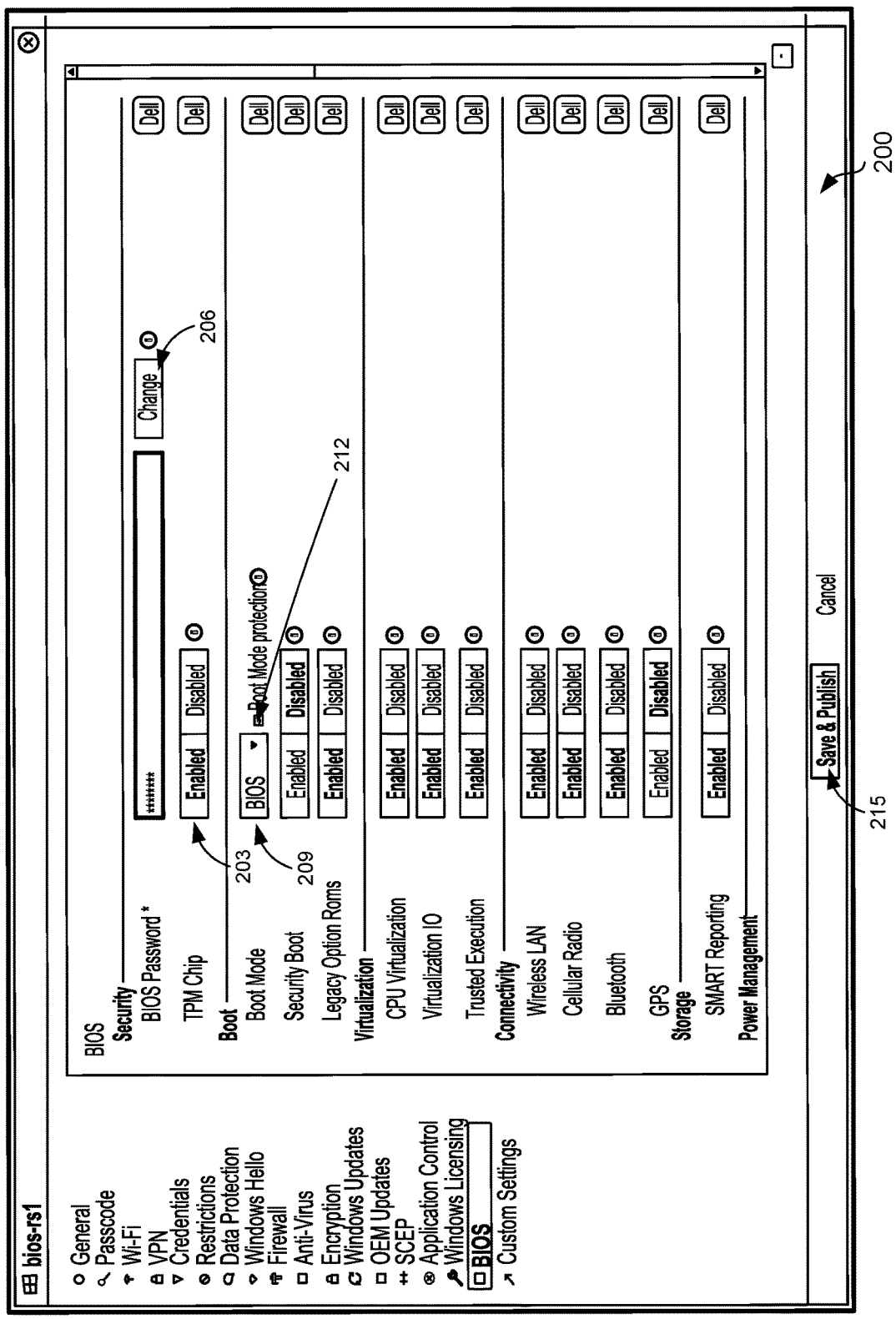
FIG. 2 is a drawing of a user interface of an administrator console for managing BIOS.

Referring now to FIG. 2, shown is an example of a user interface 200 generated by the management console 113, such as a web page, where settings of firmware attributes 133 can be specified. For instance, the firmware profile 126 shown indicates that a TPM chip should be enabled in the firmware 139 of the client device 106 by emphasizing a user interface element 203 showing Enabled. A different client device 106 having a TPM chip or other similar hardware configuration can also be associated with the firmware profile 126. The management console 113 can generate a user interface showing for example that the different client device 106 has a TPM chip that is not enabled (not shown). In that case, a user interface element showing Disabled would be emphasized. As depicted, the user interface 200 can allow an administrator to manage settings of firmware attributes 133 that make up a firmware profile 126. Firmware attributes 133 can be grouped together. For example, the user interface 200 shows groups of Security settings, Boot settings, Virtualization settings, Connectivity settings, Storage settings, and Power Management settings.

An administrator can use the management console 113 to define a compliance rule that is based on firmware attributes 133 or firmware properties 129 of a firmware profile 126. To illustrate the concept, an administrator can configure a compliance rule that specifies that TPM should be enabled for client devices 106. The management agent 146 can configure firmware 139 of a client device 106 such that the client device 106 operates in conformance with the compliance rule. The management agent 146 can identify that a client device 106 is not in conformance with the policy and can take appropriate remedial actions, such as by executing a firmware agent 149 and setting the firmware attribute 133 of the TPM to Enabled.

Some examples of security settings that can be defined by an administrator and stored in a firmware profile 126 include firmware password and TPM Chip. A firmware password can be a series of letters, numbers, and special characters. The user interface 200 provides a change password button 206 that allows an administrator to change a firmware password for a client device 106 or a group of client devices 106.

Boot settings that can be defined by an administrator and stored in a firmware profile 126. Boot settings include a user interface element 209 that can specify a boot mode of firmware 139. The boot mode can be set to protected by clicking a check box 212. There is a Secure Boot option that allows an administrator to enable or disable a secure boot. Finally, a legacy option ROMs option can be set to enabled or disabled.

As depicted, various settings can be defined by an administrator and stored in a firmware profile 126. Virtualization settings can include CPU virtualization, Virtualization IO, and Trusted Execution. Connectivity settings can include Wireless LAN Enable/Disable, Cellular Radio Enable/Disable, Bluetooth Enable/Disable, and GPS Enable/Disable. Storage settings can include Self-Monitoring, Analysis, and Reporting Technology (SMART) Reporting Enable/Disable.

The user interface 200 can allow the administrator to save a firmware profile 126. In some examples, clicking a save and publish element 215 on the user interface 200 allows the management service 111 to proceed to publish a firmware profile 126 to a client device 106 as a firmware profile 126, as depicted in FIG. 1.

Figure 3:
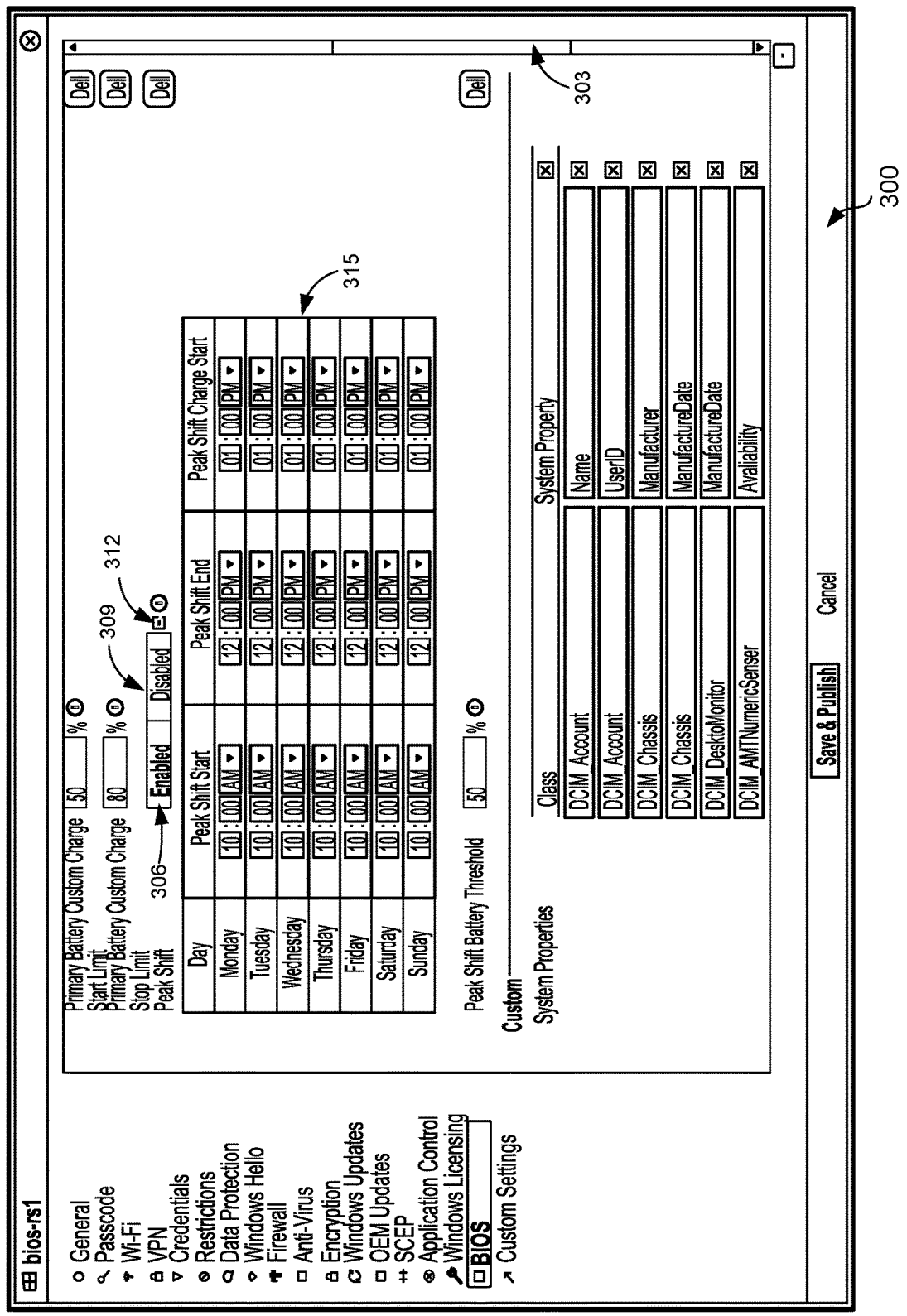
FIG. 3 is a drawing of a user interface for managing power management.

Referring now to FIG. 3 shown is an example of a user interface 300 generated by the management console 113. The user interface 300 can be used for managing power management settings of client devices 106. An enterprise may be charged more for power consumption during certain periods (e.g., during peak periods of power consumption during the day). The enterprise may have a power usage policy that mobile devices with sufficient battery power use that battery power during the day, causing a peak shift of power consumption whereby the client device 106 uses battery power during times when power pricing is highest and recharging the battery when power costs less. To implement such a peak shift of power consumption, an administrator may desire to configure firmware 139 settings of client devices 106 to set a Primary Battery Charge setting of "Custom Charge," Primary Battery Custom Charge Start Limit of "50," Primary Battery Custom Charge Stop Limit of "80," Peak Shift of "Enabled," and Peak Shift Battery Threshold to "50," such that during the day the device uses battery power until the battery charge reaches 50%.

Accordingly, the user interface 300 provides for the manipulation of various firmware attributes 133 related to power settings. Firmware attributes 133 representing Power Management settings can include Primary Battery Charge, Primary Battery Custom Charge Start Limit, Primary Battery Custom Charge Stop Limit, Peak Shift Enable/Disable, and Peak Shift Battery Threshold. As depicted, a scroll bar 303 allows a user to scroll between the user interface 200 depicted in FIG. 2 and user interface 300. The user interface 300 includes a peak shift enabled button 306, a peak shift disabled button 309, and a calendar button 312. The peak shift enabled button 306 has been emphasized. The management console 113 has rendered a calendar view 315 showing days of the week and their respective peak shift start, peak shift end, and peak shift charge times. The calendar view 315 can be rendered responsive to a user clicking the calendar button 312. The user interface 300 also depicts a Primary Battery Custom Charge Start Limit of "50," Primary Battery Custom Charge Stop Limit of "80," and Peak Shift Battery Threshold of "50," to set a battery charge percentage that can cause a device to switch back to AC current from battery power.

Figure 4:
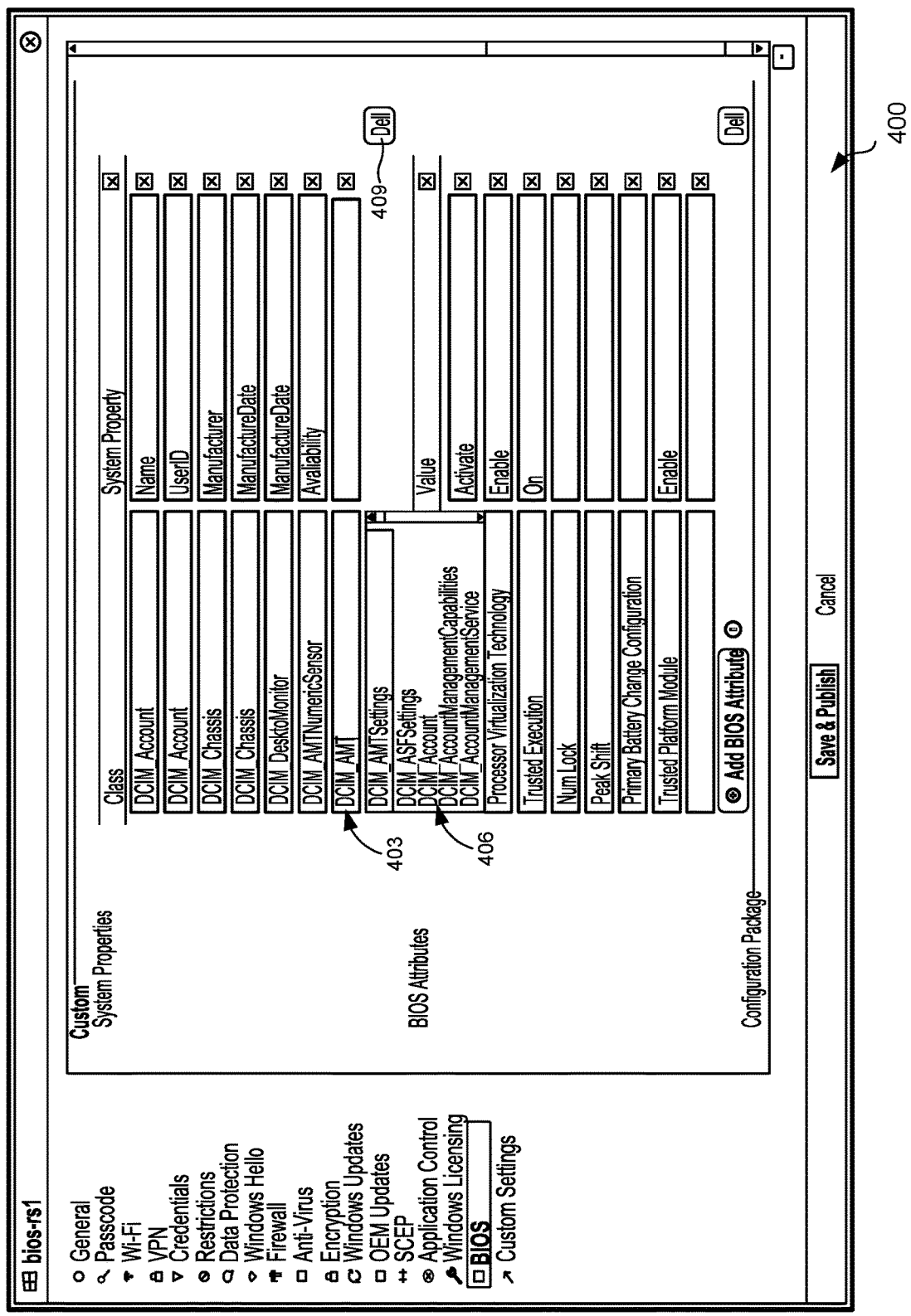
FIG. 4 is a drawing of a user interface for managing custom system properties.

Referring now to FIG. 4, show is an example of a user interface 400 generated by the management console 113 where firmware properties 129 and firmware attributes 133 can be managed. An administrator can enter firmware properties 129 and firmware attributes 133 in a number of ways. In one example, the user interface 400 as depicted shows an interface that the management service 111 can prepopulate with names of firmware properties 129 and firmware attributes 133 that are supported by a client device 106. An administrator can specify firmware properties 129 and firmware attributes 133 as plain text fields that for example correspond to the name of an account or the manufacturer corresponding to a client device 106.

The user interface 400 includes a button to allow firmware attributes 133 to be added to a firmware profile 126. In case of a conflict with an existing firmware attribute 133, the custom specified firmware attribute 133 added to the firmware profile 126 can override the predefined or preexisting firmware attribute 133. If a firmware property 129 or firmware attribute 133 is provided and no value of the property or attribute is specified, the computing environment 103 can read the value back from the client device 106. In some examples, the user interface 400 will default back to an initial state if property or attribute entries are cleared.

The user interface 400 also depicts a type-ahead (or autocomplete) field 403 that allows an administrator to specify a firmware property 129 or firmware attribute 133 without typing a whole class name. The management console 113 can obtain a partial entry of a name of a firmware property 129 or firmware attribute 133 from the management service 111 and the user interface 400 can display a list of available names of system properties supported by a client device 106. In the illustrated example, "DCIM_AMT" has been typed into the autocomplete field 403. The management service 111 can retrieve from the data store 115 a name of a firmware property 129 that is supported by a client device 106. Here, the user interface 400 has displayed a user interface element 409 to indicate that the client device 106 is a Dell® device. Responsive to an entry of "DCIM_AMT" typed into the autocomplete field 403, the user interface 400 has displayed a list 406 that includes a "DCIM_AMTSettings" firmware property 129 as one of the firmware properties 129 supported by the Dell® device. A user can select a firmware property 129 from the list 406.

An administrator can use the user interface 400 to specify a firmware property 129 as part of managing compliance for client devices 106 associated with an enterprise. An enterprise may require the client device 106 to include a chassis part number and a chip model number in the firmware 139.

An administrator may desire to determine whether these values have been set for devices, and if not, to set the values. A chassis part number and a chip model number can be maintained as firmware properties 129 of a firmware profile 126 in the management service 111.

Figure 7:
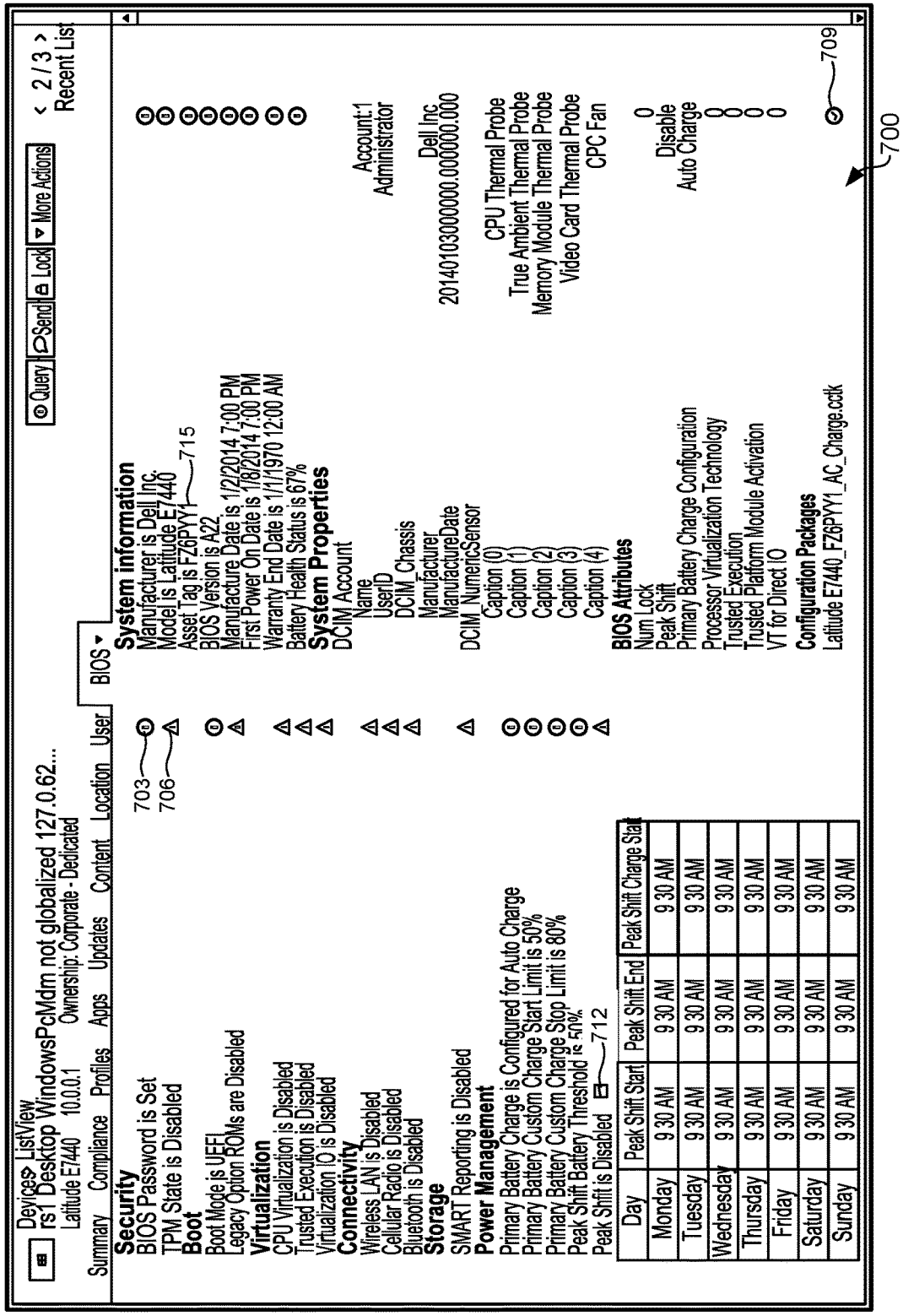
FIG. 7 is another drawing of a user interface for managing BIOS.

An administrator can also use the management console 113 to query the chassis part number and the chip model number from the firmware 139 of the client device 106. In one example, the administrator can populate the user interface 400 with a "DCIM_Chassis" class and a "DCIM_Chip" class having no values in the respective system property fields. The management agent 146 will execute a firmware agent 149 to query the values of DCIM_Chassis and DCIM_Chip from the client device 106. The values can be displayed in a firmware information page as shown in FIG. 7.

In another example, an administrator can populate the user interface 300 with a "DCIM_Chassis" class having a value of FZ6PYY1. The management service 111 can generate and place a command in a command queue 123 that, when executed by the client device 106, causes the client device 106 to set DCIM_Chassis to FZ6PYY1.

Figure 5:
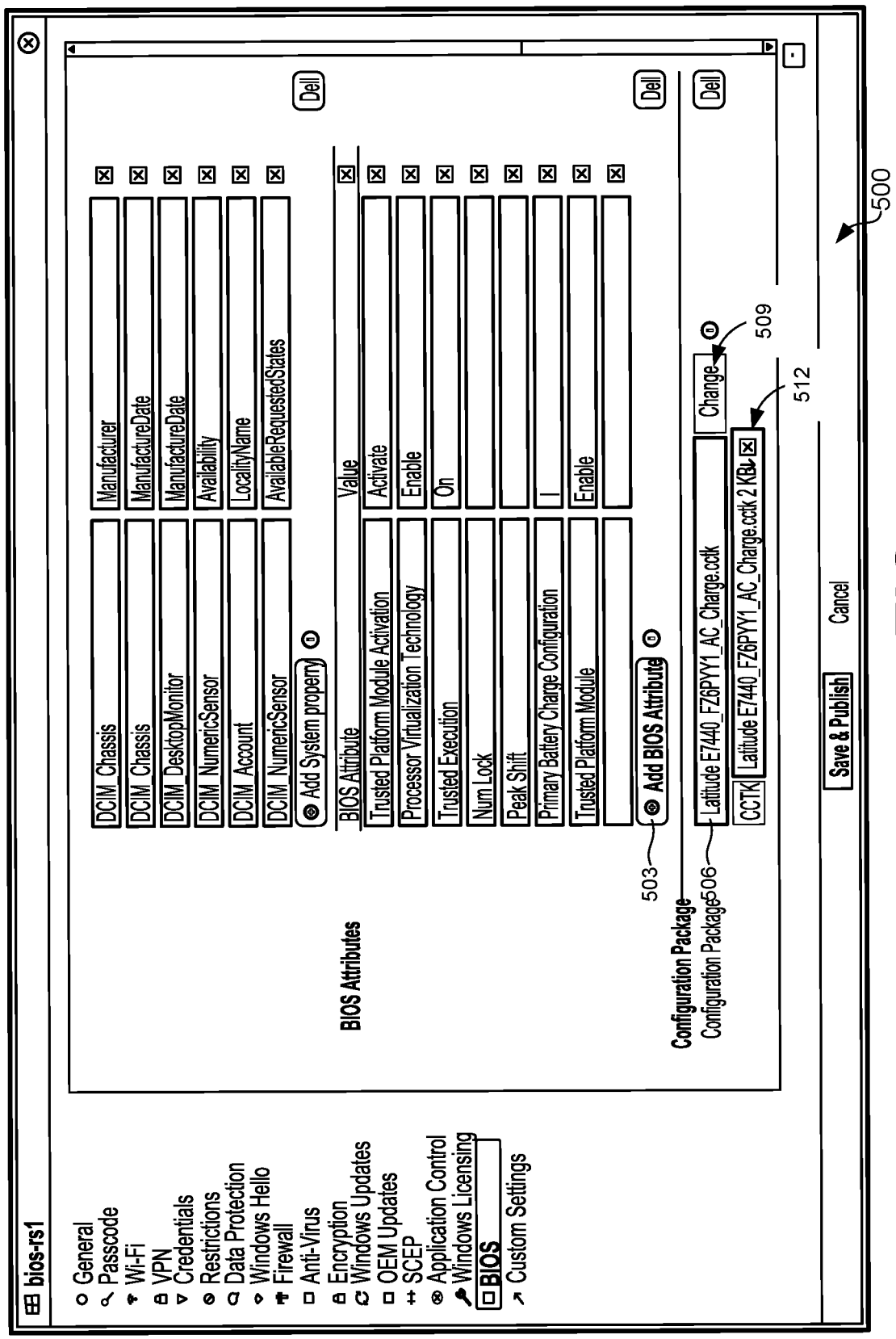
FIG. 5 is a drawing of a user interface for managing BIOS attributes and configuration package files.

Referring now to FIG. 5, show is another example of a user interface 500 generated by a management console 113 for managing firmware attributes 133 and configuration package files. The user interface 500 shows the management service 111 can prepopulate the user interface 500 with names and values of commonly used firmware attributes 133. An administrator can specify a custom firmware attribute using a type-ahead (or autocomplete) field. For example, certain client devices 106 may have a feature of firmware 139 that allows a number lock to be set. An administrator can use the user interface 500 to set a number lock for a client device 106 or a group of client devices 106. As shown, user interface 500 includes a button 503 to allow custom firmware attributes 133 to be added to a firmware profile 126.

The user interface 500 allows a configuration package to be uploaded and stored in the data store 115. The package can contain settings of various firmware attributes 133 or firmware properties 129 for creating a firmware profile 126. As depicted, the user interface element 506 shows a configuration package "Latitude E7440_FZ6PYY1_AC_Charge.cctk" has been specified. Any client devices 106 could then be instructed to download the firmware profile 126 created using the configuration package file and implement the associated changes in firmware 139. In some examples of a conflict with firmware properties 129 or predefined firmware attributes 133, the settings in configuration package can override custom and predefined properties or attributes.

The user interface 500 also shows that an administrator can select a change button 509 to upload a new configuration package or change a configuration package associated with one or more client device 106. A user can select one of the buttons in user interface element 512 to download the configuration package, to cause the configuration package to be deleted, or to cause the configuration package to be no longer associated with a client device 106.

Figure 6:
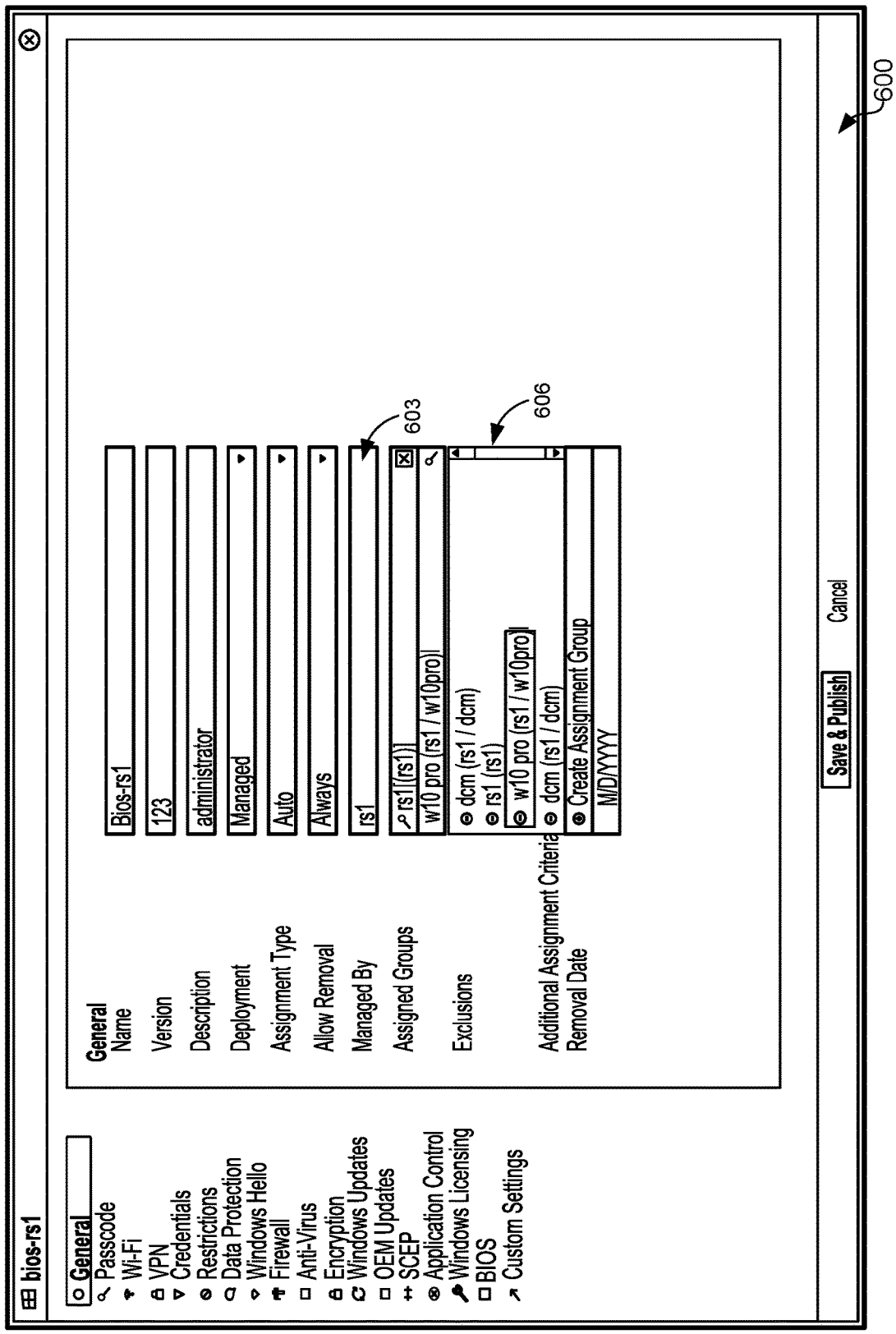
FIG. 6 is a drawing of a user interface for managing groups of managed devices.

Referring to FIG. 6, a user interface 600 for managing groups is shown. The management console 113 can generate the user interface 600. The user interface 600 can includes a general information page. The general information page can contain data about a firmware profile 126 that can help an administrator to manage multiple firmware profiles 126 and client device 106 associations. For example, user interface 500 depicts data about a firmware profile 126 named "bios-rs1."

An administrator can associate bios-rs1 with a client device 106 or a group of client devices 106. As depicted in FIG. 6, features of the present disclosure allow an administrator to assign a firmware profile 126 to a managed by element 603 that allows an organization group "rs1" to manage firmware 139 installed on a number of client devices 106. Additionally, the user interface 500 allows an administrator to exclude one or more client device 106 in a group from being associated with a firmware profile 126. The grouping element 606 as depicted in user interface 500 can improve existing device management systems that do not provide a user interface to allow an administrator to manage firmware for a group of devices. For example, grouping element 606 depicts that an administrator can type a name to assign a client device 106 to a group for managing firmware 139 of the client device 106.

Referring to FIG. 7, another user interface for managing firmware 139 is shown. The management service 111 can render a user interface 700 that includes a firmware information page. The firmware information page depicted in user interface 700 shows firmware attributes 133 and firmware properties 129 of a firmware 139 of a client device 106 designated as "rs1 Desktop WindowsPcMdm not globalized 127.0.62 . . . " The user interface 700 can render an indication of values of the firmware 139 of the client device 106. Indications can include information available (letter i in a circle), warning (exclamation point in a triangle), check mark, plain text, and other indications as can be appreciated.

For example, the user interface 700 displays an information available indication 703 to show that a firmware password firmware attribute 133 has been set for a client device 106. The warning indication 706 displays to show that a TPM chip of a client device 106 is disabled. The check mark indication 709 shows that a configuration package has been deployed to a client device 106. The management service 111 can also render a calendar view, for example when a user or administrator clicks a calendar button 712 next to an indication of a peak shift of power consumption.

As depicted, user interface 700 shows an example of values of a firmware 139 of a client device 106 that is associated with a firmware profile 126. In one example, an enterprise can specify a compliance rule that requires all devices to have an asset tag set in a firmware 139. An administrator can use the management console 113 to cause the management service 111 to create a firmware profile 126 that includes an asset tag of a client device 106 as an firmware attribute 133 or firmware property 129. In this example, the computing environment 103 has configured the firmware 139 on a client device 106 to contain an asset tag of FZ6PYY1. The user interface 700 depicts an asset tag value 715 showing "FZ6PYY1."

Figure 8:
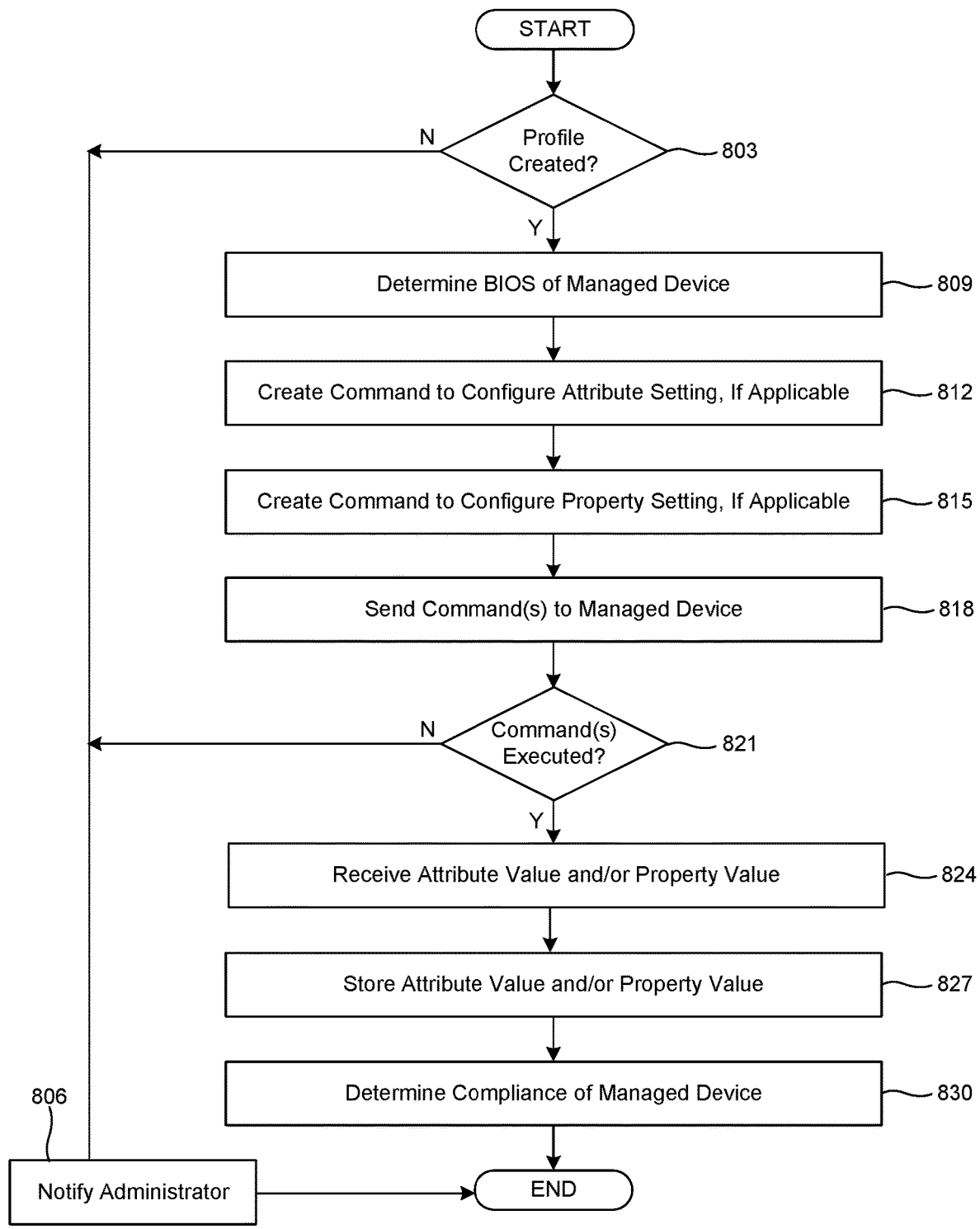
FIG. 8 is a flowchart illustrating functionality implemented by components of the networked environment of FIG. 1.

Moving on to FIG. 8, shown is a flowchart that provides one example of the operation of a portion of the management service 111. The flowchart of FIG. 8 can be viewed as depicting an example of elements of a method implemented by the management service 111 executing in the computing environment 103 according to one or more examples. The separation or segmentation of functionality as discussed herein is presented for illustrative purposes only.

Beginning with step 803, the management service 111 can identify that a firmware profile 126 has been created that pertains to a client device 106. The management service 111 can store data related to OEMs 133 in the data store 115. The OEMs 133 can correspond to a firmware 139 that is compatible with a hardware configuration of the client device 106. The firmware profile 126 can have firmware attributes 133 and firmware properties 129 that correspond to settings of the firmware 139 of the client device 106.

In some examples, the management service 111 can locate a field in a user interface that is a setting of a firmware attribute 133 of the client device 106. An administrator can specify the field as part of managing compliance for client devices 106 associated with an enterprise. In other words, the computing environment 103 can obtain a setting of a firmware attribute 133 that allows a device to be in compliance with the management service 111. In some examples, common settings can include a firmware password setting, a TPM setting, and a GPS setting that pertains to functionality of a firmware 139 of a client device 106. Thus, the field can include a textbox for entry of a firmware password, a drop down box for entry of a Boot Mode, a check box to enable a protect boot mode feature, or boxes that pertain to enable and disable of functionality of the firmware 139.

If an administrator has not created a firmware profile 126, the process can continue to step 806. In step 806, the management service 111 can notify the administrator of configuration options related to managing BIOS. For example, the management service 111 may send a message to the management console 113, which in turn renders a notification or message for the administrator. Thereafter, the process can proceed to completion. Referring back to step 803, if the administrator has created a firmware profile 126, the process can proceed to step 809.

In step 809, the management service 111 can determine a firmware 139 of a client device 106. As one example, the management service 111 can maintain a device profile 127 for one or more client device 106 that includes MAC IDs to assist the management service 111 to determine firmware 139. The management service 111 can associate a firmware profile 126 with the device profile 127 based on data stored in the device profile 127.

In some other examples, the management service 111 can query one or more configuration settings (e.g., keys or values in the WINDOWS registry) of a client device 106 to determine a firmware 139 of the client device 106. The management service 111 can also execute a firmware agent 149 provided by the manufacturer of the client device 106 to identify a firmware 139 of the client device 106. The management service 111 can read a value from the data store 115 to determine a firmware 139 of a client device 106. Determining a firmware 139 of a client device 106 can help to identify firmware attributes 133 and firmware properties 129 to configure the firmware 139 of the client device 106.

Moving to step 812, the management service 111 can create a command to configure a firmware attribute 133 of a firmware 139 of the client device 106. For example, the management service 111 can identify a setting from a field in the user interface described in step 803. As can be appreciated, the setting can include something an administrator typed into a textbox, selected from a dropdown box, selected from an option box, or other interaction with a field of a user interface. The management service 111 can configure the command using the setting and knowledge about a firmware agent 149 provided by the manufacturer to cause the command, when executed by the client device 106, to configure the firmware attribute 133 of the client device 106. As can be appreciated, the management agent 146 on the client device 106 can use the command to configure the client device 106.

Similarly, in step 815, the management service 111 can create a command to configure a setting of a firmware property 129 of the firmware 139 of the client device 106. For example, the management service 111 can identify the setting from a field in the user interface described in step 803. As can be appreciated, the setting can include something an administrator typed into a textbox, selected from a dropdown box, selected from an option box, or other interaction with a field of a user interface. The management service 111 can configure the command using the setting and knowledge about a firmware agent 149 provided by the manufacturer to cause the command, when executed by the client device 106, to configure the custom system property of the firmware 139 of the client device 106. The management agent 146 on the client device 106 can use the command to configure the client device 106.

In some examples, the management service 111 uses the command to obtain firmware values 153 of firmware attributes 133 or firmware properties 129 from the client device 106. For example, the management service 111 can create a command that does not modify a value of a firmware 139 of a management device 106. The command can cause the client device 106 to send a response to the management service 111 containing one or more firmware values 153, as described more fully below.

Moving now to step 818, the management service 111 can cause the commands to be sent to the client device 106. The management service 111 can store the command(s) in a command queue 123 associated with the client device 106. The management agent 146 can retrieve the contents of the command queue 123 by checking in with the management service 111 and requesting the contents of the command queue 123. Features of the management agent 146 are configured to cause the management agent 146 to execute the command to configure the firmware 139 on the client device 106.

In some examples, the management service 111 will send a firmware profile 126 as part of a command to configure the attribute setting described in step 812 and/or the command to configure the property setting described in step 818. The firmware profile 126 can include any firmware attributes 133 and firmware properties 129 stored in the data store 115. For instance, the management service 111 could send to the client device 106 a firmware profile 126 that configures or queries multiple features of the firmware 139 of the client device 106.

Next, in step 821, the management service 111 can determine that the command(s) has/have been executed by the client device 106. For instance, the management agent 146 can send a response to indicate that the management agent 146 has executed the command to configure the firmware attribute 133 or firmware property 129. If the command has not executed or has executed with an error message, the process can continue to step 806. In step 806, the management service 111 can notify the administrator that the command to configure (or query) the firmware 139 of a client device 106 has not executed. The command can be stored in the data store 115 for later access by the administrator. Thereafter, the process can proceed to completion.

If the command is executed step 821, then the management service 111 can receive a firmware value 153 at step 824. The firmware value 153 can include an attribute value (or a property value) representing a current status of an attribute (or a custom system property) of the firmware 139 of the client device 106.

Referring now to step 824, the management service 111 can receive a firmware value 153 for a firmware attribute 133 of firmware property 129. For example, the management service 111 could have determined at step 821 that a command setting a TPM feature to be enabled was executed by a management agent 146 of a client device 106. At step 824, the management service 111 can receive a firmware value 153 of "Enabled" that indicates the current status of the TPM feature of the firmware 139 of the client device 106.

Additionally, the management service 111 can determine at step 821 that a command to query the status of the TPM feature has been executed. The command can execute a firmware agent 149 on the client device 106 to query the status of the TPM feature. The management service can receive a firmware value 153 of "Enabled" that indicates the current status of the TPM feature as indicated by the firmware agent 149.

Similarly, the described features can be used to modify or query firmware properties 129 of the firmware 139 of the client device 106. The management service 111 can receive a firmware value 153 of FZ6PYY1 that indicates the current value of the "DCIM_Chassis" class of the firmware 139 of the client device 106.

In step 827, the management service 111 can store the received firmware value 153 in the data store 115. For example, the device profile 127 can include data fields and data values that indicate current status of the firmware 139 of the client device 106. After receiving a firmware value 153, the management service 111 can store the firmware value 153 in the device profile 127. In some other examples, a current status of the firmware 139 of a client device 106 is stored in the firmware profile 126.

Moving now to step 830, the management service 111 can determine compliance of the client device 106. For instance, the management service 111 can access the data stored in the data store 115 that indicates the current status of the firmware 139 of the client device 106. The management service 111 can determine that a compliance rule specifies that a firmware attribute 133 related to a TPM setting should be enabled for the client device 106. Having determined at step 821 that a command has been executed, the management service 111 can conclude that a TPM setting for the client device 106 has been modified from Disable to Enable. Additionally, the management service 111 can read the current status of the TPM setting of the client device 106 from the data store 115. As such, the management service 111 can determine that the client device 106 complies with one or more compliance rules. Thereafter, the process can proceed to completion.

Figure 9:
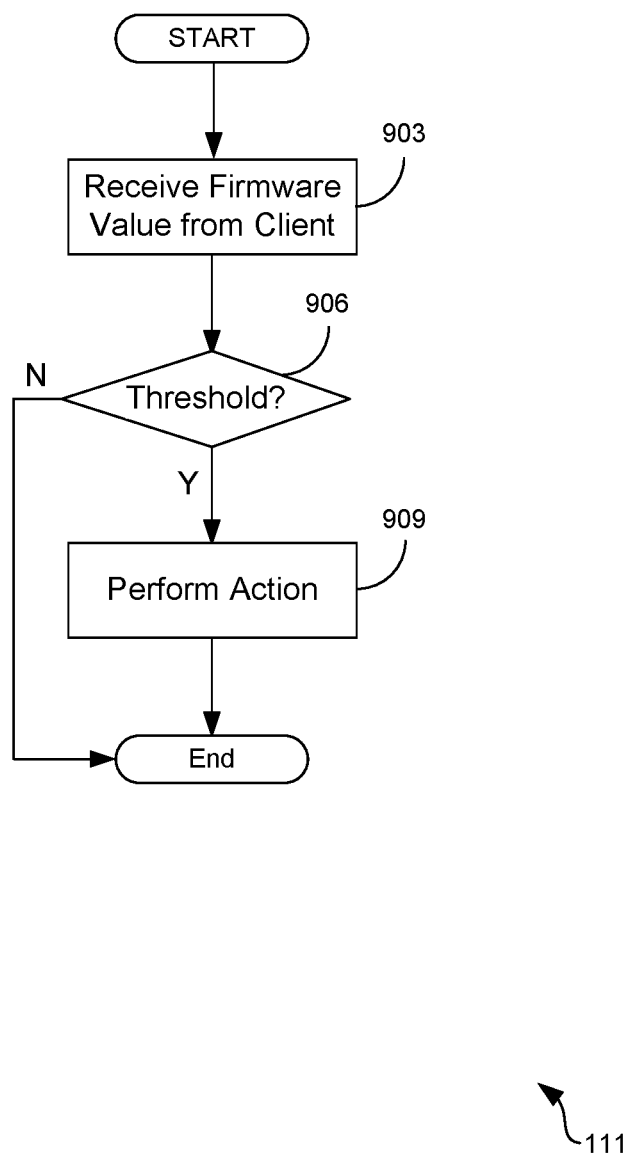
FIG. 9 is a flowchart illustrating functionality implemented by component of the networked environment of FIG. 1.

Moving on to FIG. 9, shown is a flowchart that provides one example of the operation of a portion of the management service 111. The flowchart of FIG. 8 can be viewed as depicting an example of elements of a method implemented by the management service 111 executing in the computing environment 103 according to one or more examples. The separation or segmentation of functionality as discussed herein is presented for illustrative purposes only.

Beginning at step 903, the management service 111 receives a firmware value 153 from the client device 106. For example, the management service 111 may have previously place a command to the client device 106 in a command queue 123 for the client device 106 instructing the management agent 146 to provide the requested firmware value 153 for a firmware attribute 133 or firmware property 129. The firmware value 153 is then received in response. As another example, the management agent 146 could be configured to report the firmware value 153 for one or more firmware attributes 133 or firmware properties 129 to the management service 111 at periodic intervals.

Moving on to step 906, the management service 111 evaluates whether the firmware value 153 violates a threshold condition specified by the firmware profile 126 for the client device 106. For example, if a minimum charge capacity has been specified for a corresponding firmware property 129 or firmware attribute 133 in the firmware profile 126, the management service 111 could determine whether the firmware value 153 for the charge capacity of the client device is greater than or less than the specified minimum charge capacity. If the threshold condition has been violated, then the process proceeds to step 909. Otherwise, the process ends.

Proceeding to step 909, the management service 111 performs an action specified by the firmware profile 126 in response to the determination that the threshold specified by the firmware profile 126 has been violated. For example, the firmware profile 126 might specify that if the firmware value 153 for the charge capacity is less than a specified minimum charge capacity, then a replacement battery should be ordered. Accordingly, the management service 111 might automatically place an order with a vendor or electronic commerce application for a replacement batter for the client device 106 in response to the determination that the charge capacity reported by the management agent 146 of the client device 106 is less than the minimum charge capacity specified by the firmware policy 126.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the management agent 146 and potentially other applications. Also stored in the memory can be a data store 115 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 151 upon which a user interface generated by the management console 113, the management agent 146, the firmware agent 149 or another application can be rendered. In some examples, the user interface can be generated using user interface data provided by the computing environment 103. The client device 106 can also include one or more input/output devices that can include, for example, a capacitive touchscreen or other type of touch input device, fingerprint reader, or keyboard.

Although the management service 111, management console 113, the management agent 146, the firmware agent 149, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts of FIGS. 8 and 9 show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowchart shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
a computing device comprising a processor and a memory; and
machine-readable instructions stored in the memory that, when executed by the processor, cause the computing device to at least:
determine that a firmware profile associated with a client device has been created;
determine a firmware of the client device based at least in part on querying at least one configuration settings of the client device, the at least one configuration setting comprising an operating system registry value;
generate a command to configure a firmware setting of the client device based at least in part on a value of a field in a user interface accessible to the computing device, the command comprising the firmware profile; and
cause the command to be provided to the client device.

2. The system of claim 1, wherein the command to configure the firmware setting of the client device comprises a client identifier for the client device and the firmware profile.

3. The system of claim 1, wherein the machine-readable instructions, when executed by the processor, further cause the computing device to at least determine that the command has been executed on the client device.

4. The system of claim 1, wherein the machine-readable instructions, when executed by the processor, further cause the computing device to at least:
receive a firmware value from the client device; and
store the firmware value in a device record associated with the client device.

5. The system of claim 4, wherein the firmware value indicates a current status of the firmware setting.

6. The system of claim 1, wherein the machine-readable instructions, when executed by the processor, further cause the computing device to at least determine a compliance of the client device with at least one compliance rule.

7. The system of claim 1, wherein the machine-readable instructions, when executed by the processor, further cause the computing device to at least cause to be rendered an indication of the firmware setting of the client device in the user interface.

8. A non-transitory computer-readable medium embodying executable instructions, which, when executed by a computing device, cause the computing device to at least:
determine that a firmware profile associated with a client device has been created;
determine a firmware of the client device based at least in part querying at least one configuration settings of the client device, the at least one configuration setting comprising an operating system registry value;
generate a command to configure a firmware setting of the client device based at least in part on a value of a field in a user interface accessible to the computing device, the command comprising the firmware profile; and
cause the command to be provided to the client device.

9. The non-transitory computer-readable medium of claim 8, wherein the command to configure the firmware setting of the client device comprises a client identifier for the client device and the firmware profile.

10. The non-transitory computer-readable medium of claim 8, wherein the executable instructions, when executed by the computing device, further cause the computing device to at least determine that the command has been executed on the client device.

11. The non-transitory computer-readable medium of claim 8, wherein the executable instructions, when executed by the computing device, further cause the computing device to at least:
receive a firmware value from the client device; and
store the firmware value in a device record associated with the client device.

12. The non-transitory computer-readable medium of claim 11, wherein the firmware value indicates a current status of the firmware setting.

13. The non-transitory computer-readable medium of claim 8, wherein the executable instructions, when executed by the computing device, further cause the computing device to at least determine a compliance of the client device with at least one compliance rule.

14. The non-transitory computer-readable medium of claim 8, wherein the executable instructions, when executed by the computing device, further cause the computing device to at least cause to be rendered an indication of the firmware setting of the client device in the user interface.

15. A computer-implemented method, comprising:
determining that a firmware profile associated with a client device has been created;
determining a firmware of the client device based at least in part on querying at least one configuration settings of the client device, the at least one configuration setting comprising an operating system registry value;
generating a command to configure a firmware setting of the client device based at least in part on a value of a field in a user interface, the command comprising the firmware profile; and
causing the command to be provided to the client device.

16. The computer-implemented method of claim 15, wherein the command to configure the firmware setting of the client device comprises a client identifier for the client device and the firmware profile.

17. The computer-implemented method of claim 15, further comprising determining that the command has been executed on the client device.

18. The computer-implemented method of claim 15, further comprising:
   receiving a firmware value from the client device; and
   storing the firmware value in a device record associated with the client device.

19. The computer-implemented method of claim 15, further comprising determining a compliance of the client device with at least one compliance rule.

20. The computer-implemented method of claim 15, further comprising causing to be rendered an indication of the firmware setting of the client device in the user interface.

* * * * *